US009989423B2

(12) United States Patent
Gleeson et al.

(10) Patent No.: US 9,989,423 B2
(45) Date of Patent: Jun. 5, 2018

(54) SYSTEMS AND METHODS FOR MEASURING TEMPERATURE IN A GAS TURBINE USING ACOUSTIC INTERFERENCE

(71) Applicant: General Electric Company, Schenectady, NY (US)

(72) Inventors: Eamon P. Gleeson, Atlanta, GA (US); Fei Han, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 492 days.

(21) Appl. No.: 14/611,639

(22) Filed: Feb. 2, 2015

(65) Prior Publication Data

US 2016/0223410 A1 Aug. 4, 2016

(51) Int. Cl.
*G01K 7/32* (2006.01)
*G01K 11/22* (2006.01)
*G01K 13/02* (2006.01)

(52) U.S. Cl.
CPC .............. *G01K 11/22* (2013.01); *G01K 13/02* (2013.01); *G01K 2013/024* (2013.01)

(58) Field of Classification Search
CPC combination set(s) only.
See application file for complete search history.

(56) References Cited

U.S. PATENT DOCUMENTS 3,566,689 A * 3/1971 Ringwall et al. ....... F15C 1/005 137/804
4,650,346 A 3/1987 Tehon
4,655,608 A 4/1987 Goss et al.
4,817,615 A 4/1989 Fukukita et al.
5,038,611 A 8/1991 Weldon et al.
5,370,121 A 12/1994 Reichenberger et al.
6,481,287 B1 11/2002 Ashworth et al.
2005/0205349 A1* 9/2005 Parker .................. H04R 1/2857 181/155
2010/0023298 A1* 1/2010 Bosselmann .......... G01B 15/00 702/159
2013/0216083 A1* 8/2013 McElveen .............. G10K 11/26 381/337

* cited by examiner

*Primary Examiner* — Lisa Caputo
*Assistant Examiner* — Nasir U Ahmed
(74) *Attorney, Agent, or Firm* — Eversheds Sutherland (US) LLP

(57) ABSTRACT

Systems and methods for measuring temperature in a gas turbine are disclosed. The method can include directing a first acoustic signal towards a gas path in a turbine; directing a second acoustic signal towards the gas path in the turbine; receiving the first acoustic signal and the second acoustic signal at a downstream gas path location; combining the first acoustic signal and the second acoustic signal to create a combined acoustic signal, where a portion of the first acoustic signal cancels out a portion of the second acoustic signal; and determining a temperature of the gas path based at least in part on the combined acoustic signal.

20 Claims, 5 Drawing Sheets

SYSTEMS AND METHODS FOR MEASURING TEMPERATURE IN A GAS TURBINE USING ACOUSTIC INTERFERENCE

TECHNICAL FIELD

Embodiments of this disclosure generally relate to gas turbines, and more specifically to systems and methods for measuring temperatures in a gas turbine using acoustic interference.

BACKGROUND

The control and health management of turbine engines can depend on accurately measuring temperatures throughout the engine. Accurate and reliable temperature measurements may be used for estimating the performance and health status of various engine components. Some of the instrumentation typically used for measuring temperature may include sensors and thermocouples. However, with gas temperatures reaching well above 2000° F., these components are exposed to extremely harsh conditions, making them susceptible to degradation and failure.

BRIEF DESCRIPTION OF THE DISCLOSURE

Some or all of the above needs and/or problems may be addressed by certain embodiments of the disclosure. Certain embodiments may include systems and methods for measuring temperature in a gas turbine using acoustic interference. According to one embodiment of the disclosure, a method is provided. The method may include directing a first acoustic signal towards a gas path in a turbine; directing a second acoustic signal towards the gas path in the turbine; receiving the first acoustic signal and the second acoustic signal at a downstream gas path location; combining the first acoustic signal and the second acoustic signal to create a combined acoustic signal, where a portion of the first acoustic signal cancels out a portion of the second acoustic signal; and determining a temperature of the gas path based on the combined acoustic signal.

According to another embodiment of the disclosure, a system is provided. The system may include a measurement device that is coupled to a controller. The measurement device may include a sound source that outputs an acoustic signal; a wave splitter that splits the acoustic signal into a first acoustic signal and a second acoustic signal; a carrier waveguide that directs the first acoustic signal towards a gas path in a gas turbine; an interference waveguide that directs the second acoustic signal towards the gas path in the gas turbine, where the interference waveguide is longer than the carrier waveguide; and a wave adder that combines the first acoustic signal and the second acoustic signal to create a combined acoustic signal, where a portion of the first acoustic signal cancels out a portion of the second acoustic signal. The system may further include at least one memory operable to store computer-executable instructions, where the at least one controller can access the at least one memory and execute the computer-executable instructions to generate an input signal and determine a temperature of the gas path based on the combined acoustic signal.

In yet another embodiment, one or more computer-readable media storing computer-executable instructions can be provided. The computer-executable instructions, when executed by a controller, can configure the controller to: direct, via a carrier waveguide, a first acoustic signal towards a gas path in a turbine; direct, via an interference waveguide, a second acoustic signal towards the gas path in the turbine; receive, by a wave adder, the first acoustic signal and the second acoustic signal at a downstream gas path location; combine, by the wave adder, the first acoustic signal and the second acoustic signal to create a combined acoustic signal, where a portion of the first acoustic signal cancels out a portion of the second acoustic signal; and determine, by the controller, a temperature of the gas path based on the combined acoustic signal.

Other embodiments, features, and aspects of the disclosure will become apparent from the following description taken in conjunction with the following drawings.

BRIEF DESCRIPTION OF THE DRAWINGS

Figure 1:
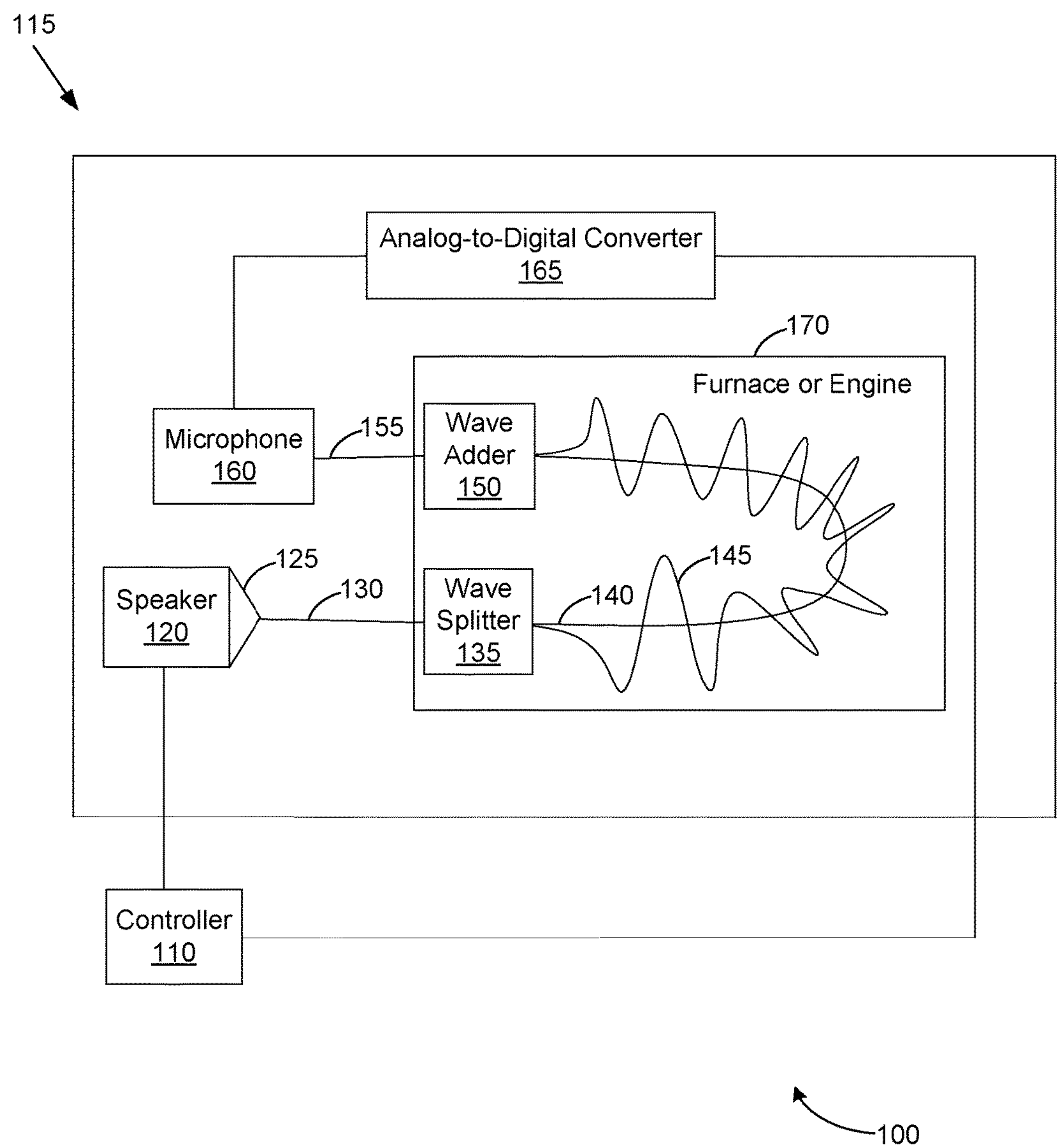

Having thus described the disclosure in general terms, reference will now be made to the accompanying drawings, which are not necessarily drawn to scale, and wherein:

FIG. 1 is a block diagram illustrating an example environment in which systems and methods for measuring temperature in a gas turbine can be implemented, according to an embodiment.

Figure 2:
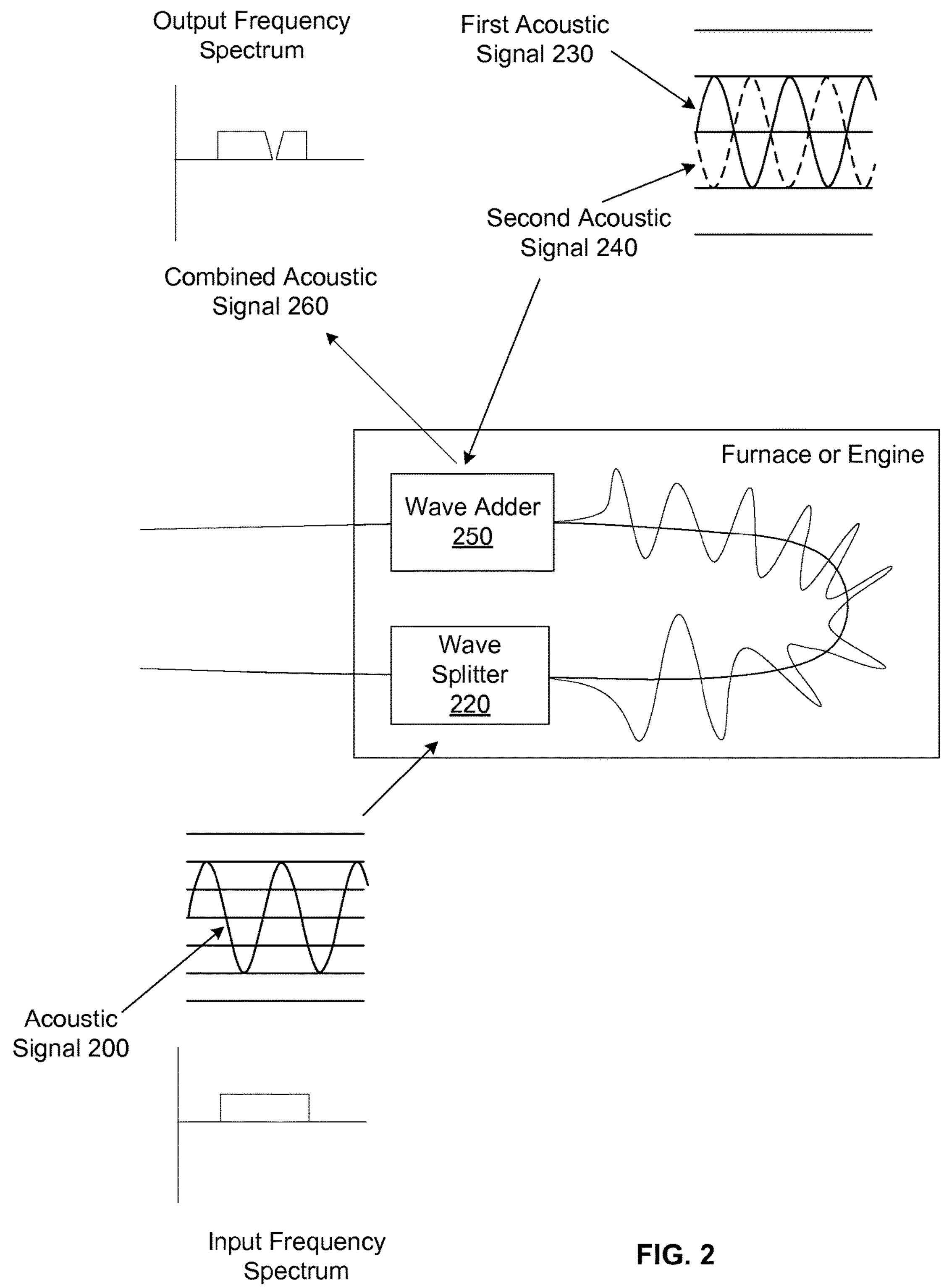

FIG. 2 illustrates an acoustic signal that may be used to measure temperature in a gas turbine, according to an example embodiment.

Figure 3:
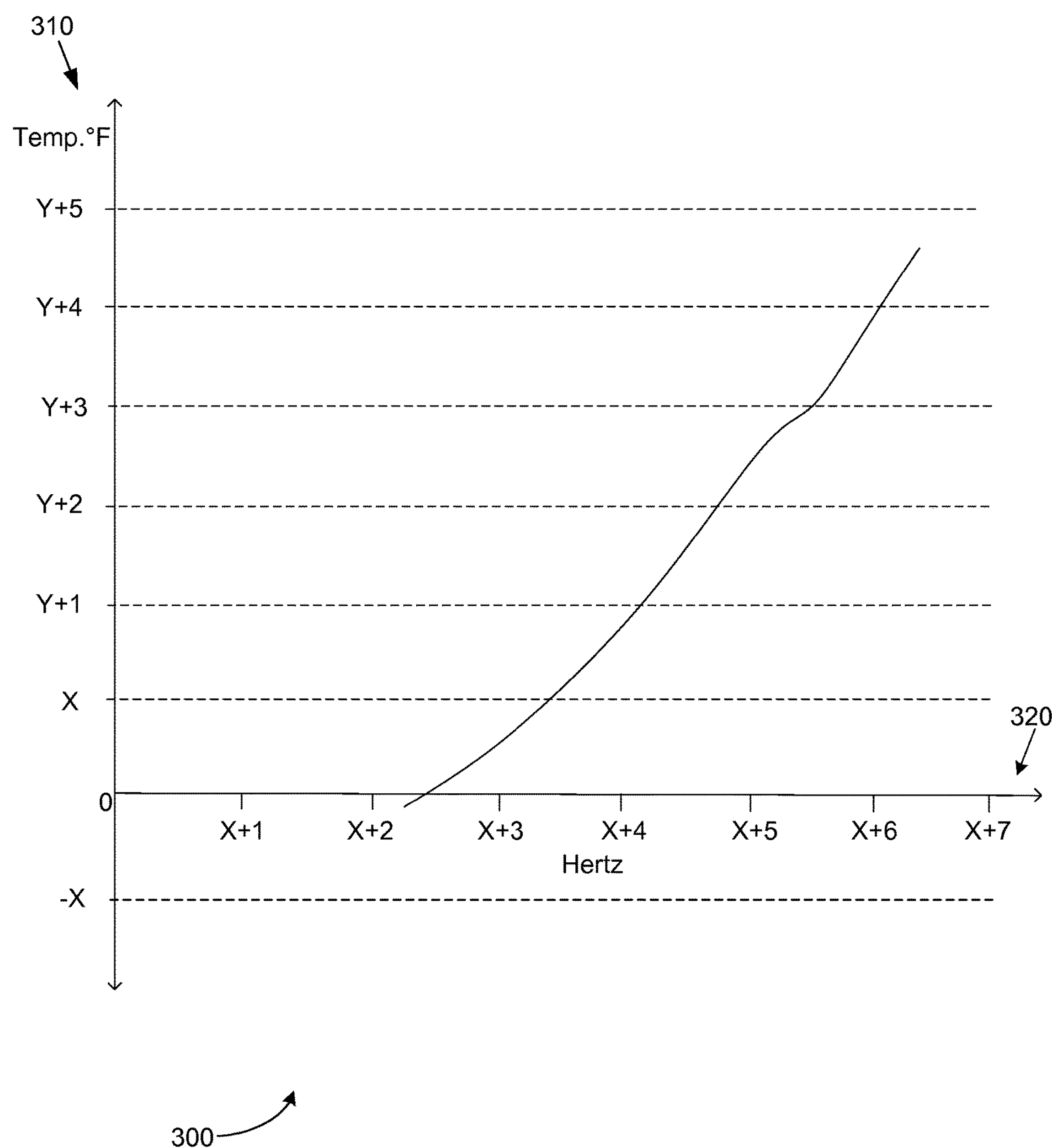

FIG. 3 illustrates a graph of temperature as a function of frequency, according to an example embodiment.

Figure 4:
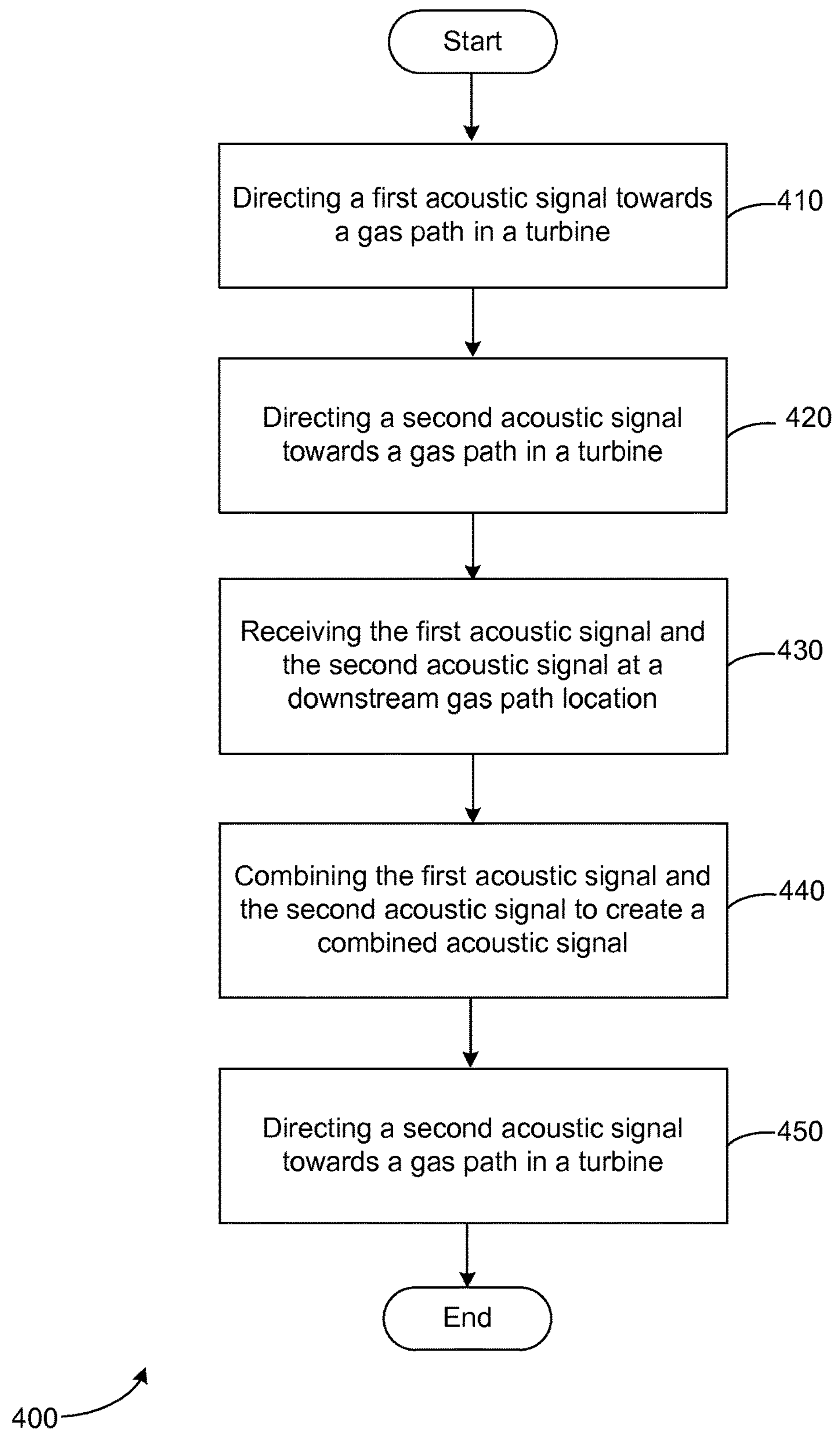

FIG. 4 is a flow chart illustrating a method for measuring temperature in a gas turbine using acoustic interference, according to an example embodiment.

Figure 5:
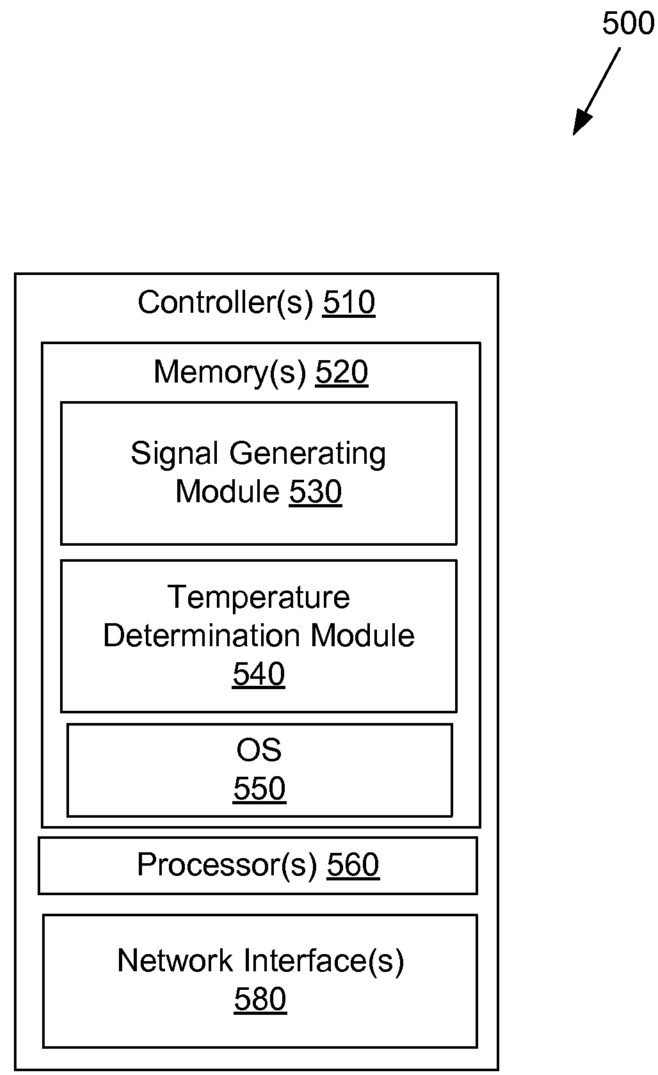

FIG. 5 is a block diagram illustrating an example system for determining temperature in a gas turbine, according to an example embodiment.

DETAILED DESCRIPTION

Illustrative embodiments of the disclosure now will be described more fully hereinafter with reference to the accompanying drawings, in which some but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

Certain embodiments described herein relate to systems and methods for measuring temperature in a gas turbine using acoustic interference. Certain embodiments may allow for increased accuracy in measuring extreme temperatures in the gas turbine. For example, as will be described in greater detail herein, an acoustic signal may be directed into a region of high temperatures, such as a hot gas path of a gas turbine. The acoustic signal may then be split into two identical signals, a first acoustic signal and a second acoustic signal. The first and second acoustic signals may then each be separately transmitted through the hot gas path on waveguides of different lengths. The first and second acoustic signals may then be received at a downstream gas path location. However, because one waveguide is longer than the other waveguide, it takes one of the acoustic signals longer to reach the downstream gas path location, thereby creating a phase shift between the signals when they reach the downstream gas path location. As a result, when the signals are recombined to create a combined acoustic signal, a portion of the first acoustic signal may cancel out a portion of the second acoustic signal. The combined acoustic signal may be processed in order to identify a frequency corresponding to the signal minimum. Based on the identified frequency, an average temperature along the hot gas path may be determined using a relationship correlating frequency to temperature.

One or more technical effects associated with certain embodiments herein may include, but are not limited to, increased accuracy in measuring high temperatures in a gas turbine. By accurately measuring temperatures in a gas turbine, improved control of the firing temperature of the gas turbine may be achieved, in addition to permitting better management of components within the combustion system. The following provides the detailed description of various example embodiments related to systems and methods for measuring temperature in a gas turbine.

FIG. 1 depicts an example system 100 that facilitates measuring temperature in a gas turbine. According to an example embodiment of the disclosure, the system 100 may include a controller 110 configured to generate an input signal, which may be representative of a desired acoustic wave. The system may further include a measurement device 115, which in turn may include a sound source 120, an input waveguide 130, and a wave splitter 135. The sound source 120 may be a device that is operable to receive the input signal generated by the controller 110 and produce an acoustic signal of sound. For example, the sound source 120 may be a speaker, a solenoid air valve, a siren, a shaker driven diaphragm, or an air horn. The acoustic signal may then be transmitted through the input waveguide 130 from the sound source to a wave splitter 135. As shown in FIG. 1, the wave splitter 135 may be located in a region 170 of high temperatures, such as, for example, a gas turbine engine or furnace. Upon receiving the acoustic signal, the wave splitter 135 may be operable to split the acoustic signal into two identical signals, a first acoustic signal and a second acoustic signal.

With continued reference to FIG. 1, the measurement device 115 may further include a carrier waveguide 140, an interference waveguide 145, and a wave adder 150, which may also be located within the region 170 of high temperatures. As shown in FIG. 1, the wave splitter 135 may be coupled to the wave adder 150 via the carrier waveguide 140 and the interference waveguide 145, where the carrier waveguide 140 and the interference waveguide 145 are of known lengths. In certain embodiments, the wave splitter 135 may be located on one end of the region 170 and the wave adder 150 may be located on an opposite end of the region 170 at a known distance corresponding to the length of the carrier waveguide 140. In certain embodiments, the first acoustic signal may then be directed from the wave splitter 135 to the wave adder 150 via the carrier waveguide 140. Similarly, the second acoustic signal may be directed from the wave splitter 135 to the wave adder 150 via the interference waveguide 145. The wave adder 150, which may be located at a downstream gas path location, may be configured to combine the first and second acoustic signals to create a combined acoustic signal.

In certain embodiments, the carrier waveguide 140 and the interference waveguide 145 may be of different lengths. The difference in transit times between the first and second acoustic signals may create an interference pattern, which may be evaluated in order to determine the average temperature along the length of the carrier waveguide 140 between the wave splitter 135 and the wave adder 150. For example, in one embodiment, the length of the interference waveguide 145 may be longer than the length of the carrier waveguide 140. As a result, it takes the second acoustic signal longer than the first acoustic signal to travel to the wave adder 150 from the wave splitter 135. This creates an interference pattern such that when the first and second acoustic signals are combined by the wave adder 150, a portion of the first acoustic signal cancels out a portion of the second acoustic signal. In certain embodiments, the combined acoustic signal may be further processed to identify a frequency corresponding to the signal minimum, which may be correlated to the temperature of the gas inside the region 170 using known acoustic thermodynamic and acoustic relationships.

Still referring to FIG. 1, the combined acoustic signal may be transmitted outside the region 170 of high temperatures, where it may be processed in order to identify a frequency corresponding to the signal minimum. To do so, the measurement device 115 may further include an output waveguide 155, a microphone 160, and a analog-to-digital converter 165. The combined acoustic signal may be directed from the wave adder 150 to the microphone 160 via the output waveguide 155. The microphone 160 may be operable to generate an electrical wave based on the combined acoustic signal. The microphone 160 may be coupled to the input of the analog-to-digital converter 165. The electrical wave may be transmitted from the microphone 160 to the analog-to-digital converter 165, which may be operable to generate an analog signal based on the electrical wave. Additionally, the analog-to-digital converter 165 may then sample the analog signal in order to acquire data suitable for determining the frequency content of the signal by the controller 110.

With continued reference to FIG. 1, the controller 110 may receive the analog signal and associated data from the analog-to-digital converter 165. Thereafter, the controller 110 may be configured to execute a temperature determination module that employs fast Fourier transform (FFT) techniques to determine the frequency content of the analog signal in order to identify a particular frequency corresponding to the signal minimum. Based in part on the identified frequency, the temperature determination module may be operable to determine a temperature in the gas turbine using the temperature frequency profile. In certain embodiments, the determined temperature may be used by the controller 110 to assist in management of the gas turbine.

As desired, embodiments of the disclosure may include a system 100 with more or fewer components than are illustrated in FIG. 1. Additionally, certain components of the system 100 may be combined in various embodiments of the disclosure. The system 100 of FIG. 1 is provided by way of example only.

Referring now to FIG. 2, shown is an acoustic signal 200 as it is transmitted to a wave splitter 220 from a sound source, such as the sound source 120 in FIG. 1. As shown in FIG. 2, in certain embodiments, the acoustic signal 200 may have an input frequency spectrum that is a specific bandwidth of frequency.

Still referring to FIG. 2, also shown is a first acoustic signal 230 and a second acoustic signal 240 as it is transmitted to a wave adder 250 from the wave splitter 220. In certain embodiments, the first acoustic signal 230 and the second acoustic signal 240 may be transmitted from the wave splitter 220 to the wave adder 250 on waveguides of different lengths, which creates a phase shift between the first acoustic signal 230 and the second acoustic signal 240 when they reach the wave adder 250. As can be seen in FIG. 2, a 180 degree phase shift may be created between the first acoustic signal 230 and the second acoustic signal 240 when they reach the wave adder 250 at a specific frequency.

Accordingly, when the first acoustic signal 230 and the second acoustic signal 240 are combined by the wave adder 250 to create a combined acoustic signal 260, a portion of the first acoustic signal 230 cancels out a portion of the second acoustic signal 240. As a result, the combined acoustic signal 260 may have an output frequency spectrum with a specific frequency being cancelled out. This frequency may be correlated to a temperature in a gas turbine, such as, for instance, an exhaust temperature, a temperature within the hot gas path, the actual firing temperature, and the like.

Referring now to FIG. 3, shown is a graph 300 illustrating an example temperature-frequency profile in accordance with an example embodiment. As shown in FIG. 3, the graph 300 may include an y-axis 310 corresponding to temperature in degrees Fahrenheit and an x-axis 320 corresponding to frequency in Hertz.

With continued reference to FIG. 3, in certain embodiments, a controller, such as the controller 110 in FIG. 1, may be operable to identify a particular frequency corresponding to the signal minimum in a combined acoustic signal. Based on the identified frequency, the controller may further be operable to access graph 300 in order to determine a temperature in a gas turbine using a relationship correlating frequency to temperature. For example, if the frequency corresponding to the signal minimum is approximately 778 Hertz, the controller may determine that the average temperature along a hot gas path of the gas turbine is approximately 752° F.

Referring now to FIG. 4, shown is a flow diagram of an example method 400 for measuring high temperatures in a gas turbine using acoustic interference, according to an example embodiment. The method 400 may be utilized in association with various systems, such as the system 100 illustrated in FIG. 1 using controller 110 and measurement device 115.

The method 400 may begin at block 410. At block 410, a first acoustic signal may be directed towards a gas path in a turbine. Similarly, at block 420, a second acoustic signal may be directed towards the gas path in the turbine. In certain embodiments, the first and second acoustic signals may be created from an acoustic signal transmitted to a wave splitter, such as wave splitter 135 in FIG. 1, which is operable to split the acoustic signal into the first and second acoustic signals.

Next, at block 430, the method 400 may include receiving the first acoustic signal and the second acoustic signal at a downstream gas path location. A wave adder, such as wave adder 150 in FIG. 1, may be located at a downstream gas path location and operable to receive the first and the second acoustic signals. In certain embodiments, the first acoustic signal may be directed from a wave splitter to the wave adder via a carrier waveguide, such as carrier waveguide 140 in FIG. 1. Similarly, the second acoustic signal may be directed from the wave splitter to the wave adder via an interference waveguide, such as interference waveguide 145 in FIG. 1, where the interference waveguide is longer than the carrier waveguide in order to create an interference pattern between the two signals when they are recombined.

Next, at block 440, the method 400 may include combining the first acoustic signal and the second acoustic signal to create a combined acoustic signal, where a portion of the first acoustic signal cancels out a portion of the second acoustic signal.

Next, at block 450, the method 400 may include determining a temperature of a gas path based on the combined acoustic signal. In certain embodiments, the temperature of the gas path may be determined by a controller, such as controller 110 in FIG. 1. The controller may be operable to process the combined acoustic signal in order to identify a frequency corresponding to where a portion of the first acoustic signal cancels out a portion of the second acoustic signal. Based on the identified frequency, the controller may determine a temperature in the gas turbine using a temperature frequency profile.

The method 400 of FIG. 4 may optionally end following block 450.

Referring now to FIG. 5, a block diagram is depicted in one example system 500 operable to determine a temperature in a gas turbine In certain embodiments, the system 500 may include a signal generating module 530 that is associated with a controller 510. The signal generating module 530 may be operable to generate one or more input signals, which may be representative of a desired acoustic wave. In one embodiment, the input signals may be transmitted by the controller 510 to a sound source associated with a measurement device, such as sound source 120 in measurement device 115 in FIG. 1. The sound source may be operable to generate an acoustic signal that comprises an acoustic spectrum based on the input signal.

Additionally, the system 500 may include a temperature determination module 540 that is associated with the controller 510. The temperature determination module 540 may be operable to determine a temperature in a gas turbine based on a combined acoustic signal. In one embodiment, the temperature determination module 540 may receive data suitable for determining the frequency content of the combined acoustic signal from a measurement device, such as measurement device 115 in FIG. 1. In a further embodiment, the temperature determination module 540 may be operable to employ fast Fourier transform (FFT) techniques to determine the frequency content of the combined acoustic signal in order to identify a particular frequency corresponding to the signal minimum. Based in part on the identified frequency, the temperature determination module 540 may be operable to determine a temperature in the gas turbine using the temperature frequency profile.

The controller 510 may include any number of suitable computer processing components that may, among other things, determine the temperature in a gas turbine. Examples of suitable processing devices that may be incorporated into the controller 510 include, but are not limited to, personal computers, tablet computers, wearable computers, personal digital assistants, mobile phones, application-specific circuits, microcontrollers, minicomputers, other computing devices, and the like. As such, the controller 510 may include any number of processors 560 that facilitate the execution of computer-readable instructions. By executing computer-readable instructions, the controller 510 may include or form a special purpose computer or particular machine that facilitates processing of intake filter management.

In addition to one or more processors 560, the controller 510 may include one or more memory devices 520, and/or one or more communications and/or network interfaces 580. The one or more memories 520 may include any suitable memory devices, for example, caches, read-only memory devices, random access memory devices, magnetic storage devices, etc. The one or more memories 520 may store filter and pulsing data, executable instructions, and/or various program modules utilized by the controller 510, for example, the signal generating module 530, the temperature determination module 540, and an operating system (O/S)

550. The one or more memories 520 may include any suitable data and applications that facilitate the operation of the controller 510. In certain embodiments, the one or more memories 520 may be further operable to store data associated with the combined acoustic signal. The 0/S 550 may include executable instructions and/or program modules that facilitate and/or control the general operation of the controller 510.

Additionally, the O/S 550 may facilitate the execution of other software programs and/or program modules by the processor(s) 560, such as the signal generating module 530 and the temperature determination module 540. The signal generating module 530 and the temperature determination module 540 may be a suitable software module with corresponding hardware capability configured to allow communication with objects outside the controller 510. For example, the signal generating module 530 and the temperature determination module 540 may communicate with a measurement device, such as measurement device 115 in FIG. 1, via network interface 580 and a network.

As desired, embodiments of the disclosure may include a system 500 with more or fewer components than are illustrated in FIG. 5. Additionally, certain components of the system 500 may be combined in various embodiments of the disclosure. The system 500 of FIG. 5 is provided by way of example only.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for measuring temperature, the method comprising:

directing a first acoustic signal towards a gas path in a turbine via a carrier waveguide;

directing a second acoustic signal towards the gas path in the turbine via an interference waveguide, wherein the interference waveguide is longer than the carrier waveguide to create a phase shift between the first acoustic signal and the second acoustic signal;

receiving the first acoustic signal and the second acoustic signal at a downstream gas path location;

combining the first acoustic signal and the second acoustic signal to create a combined acoustic signal, wherein a portion of the first acoustic signal cancels out a portion of the second acoustic signal; and determining a temperature of the gas path based at least in part on a frequency corresponding to the portion of the first acoustic signal canceling out the portion of the second acoustic signal in the combined acoustic signal.

2. The method of claim 1, wherein directing a first acoustic signal and a second acoustic signal towards a gas path in a turbine comprises:

transmitting an input signal to a sound source;

generating, via the sound source, an acoustic signal based at least in part on the input signal;

transferring the acoustic signal from the sound source to a wave splitter via an input waveguide;

splitting, via the wave splitter, the acoustic signal into the first acoustic signal and the second acoustic signal;

directing the first acoustic signal via the carrier waveguide; and directing the second acoustic signal via the interference waveguide.

3. The method of claim 2, wherein the acoustic signal comprises an acoustic spectrum.

4. The method of claim 2, wherein a controller is coupled to the sound source, and wherein the controller is configured to generate the input signal.

5. The method of claim 2, wherein the sound source comprises at least one of: (i) a speaker, (ii) a solenoid air valve, (iii) a siren, (iv) a shaker drive diaphragm, or (v) an air horn.

6. The method of claim 1, wherein the temperature of the gas path comprises at least one of: (i) an exhaust temperature of a gas turbine, (ii) a temperature within a hot gas path of a gas turbine, or (iii) an actual firing temperature of a gas turbine, or any other temperature that is desired to measure.

7. The method of claim 1, wherein combining the first acoustic signal and the second acoustic signal to create a combined acoustic signal comprises:

combining the first acoustic signal and the second acoustic signal via a wave adder;

directing the combined acoustic signal from the wave adder to a microphone via an output waveguide, wherein the microphone is coupled to an analog-to-digital converter;

generating, via the microphone, an electrical wave based on the combined acoustic signal;

generating, via the microphone, an analog signal based on the electrical wave; and converting, via the analog-to-digital converter, the analog signal into a digital signal.

8. The method of claim 7, wherein determining, via a controller, a temperature of the gas path based at least in part on a frequency corresponding to the portion of the first acoustic signal that cancels out the portion of the second acoustic signal in the combined acoustic signal comprises:

identifying, via the controller, some signal minima in the digital signal corresponding to the portion of the first acoustic signal that cancels out a portion of the second acoustic signal;

selecting, via the controller, the frequency associated with the signal minima, wherein the frequency is associated with a temperature; and determining, via the controller, the temperature of the gas path based at least in part on the selected frequency.

9. The method of claim 1, wherein the temperature of the gas path is an average temperature across the carrier waveguide.

10. The method of claim 1, wherein the carrier waveguide and the interference waveguide are disposed between a wave splitter and a wave adder.

11. A gas turbine temperature measurement system comprising:

a measurement device comprising:

a sound source configured to output an acoustic signal;

a wave splitter configured to split the acoustic signal into a first acoustic signal and a second acoustic signal;

a carrier waveguide configured to direct the first acoustic signal towards a gas path;

an interference waveguide configured to direct the second acoustic signal towards the gas path, wherein the interference waveguide is longer than the carrier waveguide to create a phase shift between the first acoustic signal and the second acoustic signal;

a wave adder configured to combine the first acoustic signal and the second acoustic signal to create a combined acoustic signal, wherein a portion of the first acoustic signal cancels out a portion of the second acoustic signal;

at least one memory operable to store computer-executable instructions; and at least one controller configured to access the at least one memory and execute the computer-executable instructions to:

generate an input signal; and determine a temperature of the gas path based at least in part on a frequency corresponding to the portion of the first acoustic signal that cancels out the portion of the second acoustic signal in the combined acoustic signal.

12. The system of claim 11, wherein the acoustic signal comprises an acoustic spectrum.

13. The system of claim 11, wherein the sound source comprises at least one of: (i) a speaker, (ii) a solenoid air valve, (iii) a siren, (iv) a shaker drive diaphragm, or (v) an air horn.

14. The system of claim 11, wherein the temperature of the gas path comprises at least one of: (i) an exhaust temperature of a gas turbine, (ii) a temperature within a hot gas path of a gas turbine, or (iii) an actual firing temperature of a gas turbine, or any other temperature that is desired to measure.

15. The system of claim 11, wherein the at least one controller is coupled to the sound source and further configured to transmit the input signal to the sound source.

16. The system of claim 11, further comprising a microphone configured to:

generate an electrical wave based on measuring the combined acoustic signal; and generate an analog signal based on the electrical wave.

17. The system of claim 16, further comprising an analog-to-digital converter to convert the analog signal into a digital signal.

18. The system of claim 17, wherein the at least one controller configured to access the at least one memory and execute the computer-executable instructions to determine a temperature of the gas path based at least in part on a frequency corresponding to the portion of the first acoustic signal that cancels out the portion of the second acoustic signal in the combined acoustic signal comprises:

identifying some signal minima in the digital signal, wherein the signal minima corresponds to the portion of the first acoustic signal canceled out by a portion of the second acoustic signal;

selecting the frequency associated with the signal minima, wherein the frequency is associated with a temperature; and determining the temperature of the gas path based at least in part on the selected frequency.

19. The system of claim 11, wherein the carrier waveguide and the interference waveguide are disposed between the wave splitter and the wave adder.

20. A non-transitory computer-readable medium comprising computer-readable instructions operable to:

direct, via at least one carrier waveguide, a first acoustic signal towards a gas path in a turbine;

direct, via at least one interference waveguide, a second acoustic signal towards the gas path in the turbine, wherein the interference waveguide is longer than the carrier waveguide to create a phase shift between the first acoustic signal and the second acoustic signal;

receive, via at least one wave adder, the first acoustic signal and the second acoustic signal at a downstream gas path location;

combine, via the at least one wave adder, the first acoustic signal and the second acoustic signal to create a combined acoustic signal, wherein a portion of the first acoustic signal cancels out a portion of the second acoustic signal; and determine, via at least one controller, a temperature of the gas path based at least in part on a frequency corresponding to the portion of the first acoustic signal that cancels out the portion of the second acoustic signal in the combined acoustic signal.

* * * * *